United States Patent
Miyano et al.

(10) Patent No.: US 7,879,508 B2
(45) Date of Patent: Feb. 1, 2011

(54) SEPARATOR FOR LOW-TEMPERATURE TYPE FUEL CELL AND PRODUCTION METHOD THEREFOR

(75) Inventors: Tsutomu Miyano, Osaka (JP); Takeshi Shimizu, Osaka (JP); Keiji Izumi, Osaka (JP); Yoshikazu Morita, Osaka (JP); Shinichi Kamoshida, Osaka (JP); Toshiki Kingetsu, Osaka (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 12/353,644

(22) Filed: Jan. 14, 2009

(65) Prior Publication Data

US 2009/0130535 A1    May 21, 2009

Related U.S. Application Data

(63) Continuation of application No. 10/312,158, filed as application No. PCT/JP01/07783 on Sep. 7, 2001, now Pat. No. 7,608,119.

(30) Foreign Application Priority Data

Sep. 12, 2000 (JP) ................................ 2000-276893

(51) Int. Cl.
*H01M 8/04*    (2006.01)
*H01M 8/24*    (2006.01)

(52) U.S. Cl. ........................ 429/514; 429/457

(58) Field of Classification Search .................... 429/32
See application file for complete search history.

(56) References Cited

U.S. PATENT DOCUMENTS

| | | | |
|---|---|---|---|
| 3,337,434 A | 8/1967 | Jamieson et al. | |
| 5,773,087 A | 6/1998 | Kashihara et al. | |
| 6,129,995 A * | 10/2000 | Hashimoto et al. | .......... 428/629 |
| 6,379,476 B1 | 4/2002 | Tarutani et al. | |
| 6,440,598 B1 | 8/2002 | Fukui et al. | |
| 6,660,419 B1 * | 12/2003 | Nishida et al. | ................ 429/32 |

FOREIGN PATENT DOCUMENTS

| | | |
|---|---|---|
| EP | 1094535 A1 | 4/2001 |
| JP | 357032400 | 2/1982 |

(Continued)

OTHER PUBLICATIONS

Englebert, Dan; "Passivation of Stainless Steel"; PF Online (pfonline.com/articles/119806.html). See paragraphs 1-3.

*Primary Examiner*—Dah-Wei D Yuan
*Assistant Examiner*—Stephen Essex
(74) *Attorney, Agent, or Firm*—The Webb Law Firm

(57) ABSTRACT

A stainless steel sheet useful as a separator for a low-temperature fuel cell has the surface state that a lot of fine projections (p) stand close together around many fine pits (d) formed over a whole surface. The surface state is realized by alternating electrolytic etching in a ferric chloride solution. When the stainless steel separator is built in a fuel cell, contact resistance between the separator and a graphite electrode is kept at a lower level even in a corrosive atmosphere. Consequently, the fuel cell can be driven with high power-generating efficiency over a long term even under severely corrosive conditions without generation of massive Joule heat.

2 Claims, 2 Drawing Sheets

FOREIGN PATENT DOCUMENTS

| | | |
|---|---|---|
| JP | 08127849 | 5/1996 |
| JP | 8180883 A | 7/1996 |
| JP | 11121018 A | 4/1999 |
| JP | 11126621 A | 5/1999 |
| JP | 11126622 A | 5/1999 |
| JP | 200132056 A | 2/2001 |
| JP | 2001214286 A | 8/2001 |
| WO | WO 00/01025 * | 1/2000 |
| WO | 0213300 A1 | 2/2002 |

* cited by examiner

SEPARATOR FOR LOW-TEMPERATURE TYPE FUEL CELL AND PRODUCTION METHOD THEREFOR

CROSS-REFERENCE TO RELATED APPLICATIONS

This application is a continuation of co-pending U.S. patent application Ser. No. 10/312,158, filed Dec. 19, 2002, entitled "SEPARATOR FOR A LOW-TEMPERATURE FUEL CELL AND PRODUCTION METHOD THEREFOR", which was the National Stage of International Application No. PCT/JP01/07783, filed Sep. 7, 2001, under 35 U.S.C. §371, which are hereby incorporated by reference in their entireties.

BACKGROUND OF THE INVENTION

1. Field of the Invention

The present invention relates to a separator for such a fuel cell as a solid polymer-type fuel cell, which is driven at a low temperature, and a method of manufacturing a separator for the purpose.

2. Description of the Related Art

A solid polymer-type fuel cell has the advantage that it is started in a short time and driven at a temperature lower than 100° C., in comparison with other types of fuel cells. Since it is built up by all solid members with simplified structure, it is maintained with ease and suitable for use in an environment subjected to vibrations or shocks. Moreover, it can be designed to small size due to high power density, and a fuel is efficiently consumed for power generation with less noise. Accounting these advantages, applicability of the solid polymer-type fuel cell to a power source of an automobile has been researched and examined in these days. Provided that a fuel cell, which gains the same mileage as a gasoline engine, is offered, an automobile can be driven under very clean conditions without generation of $NO_x$ and $SO_x$. Discharge of $CO_2$ can be also remarkably reduced.

A solid polymer-type fuel cell involves a solid macromolecular membrane which includes a proton-exchange group in its molecule and acts as a proton-transferring electrolyte. This type fuel cell is driven by the same way as other types of fuel cells, i.e. supply of a fuel gas such as hydrogen to one side of the membrane while supplying an oxidizing gas such as oxygen to the other side of the membrane.

A representative solid polymer-type fuel cell is built up by bonding graphite electrodes, i.e., an oxidizing electrode 2 (cathode) and a fuel electrode 3 (anode), respectively to both surfaces of a solid macromolecular membrane 1, and locating the membrane 1 together with gaskets 4, 4 between separators 5 and 5, as shown in FIG. 1A. The separator 5 at the side of the oxidizing electrode 2 has an oxygen-supply opening 6 and an oxygen-discharge opening 7 formed therein, while the separator 5 at the side of the fuel electrode 3 has a hydrogen-supply opening 8 and a hydrogen-discharge opening 9 formed therein. Air may be supplied through the opening 6 to the oxidizing electrode 2, instead of oxygen.

A plurality of grooves 10, which extends along flow directions of hydrogen (g) and oxygen (o), are formed in the separators 5, 5 in order to ensure sufficient supply and uniform distribution of hydrogen (g) and oxygen (o). Water-cooling means, whereby coolant water is supplied from openings 11, circulated in the separators 5, 5 and then discharged from openings 12, are also built in the separators 5, 5 in order to release a heat during power generation.

Hydrogen (g) is fed from the openings 8 to a space between the fuel electrode 3 and the separator 5. Hydrogen (g) becomes a proton after discharge of an electron. The proton transfers through the membrane 1 and accepts an electron at the oxidizing electrode 2. Thereafter, hydrogen is burnt with oxygen (o) or air fed to a space between the oxidizing electrode 2 and the separator 5. Electric power is outputted by connecting a load resistor between the oxidizing electrode 2 and the fuel electrode 3.

Since electric power generated by one fuel cell is very tiny, a plurality of cells each composed of the membrane 1 sandwiched between the separators 5, 5 are stacked together, as shown in FIG. 1B, in order to increase electric power to a level suitable for practical use. However, power-generating efficiency is substantially varied in response to electric resistance concerning contact of the separators 5, 5 with the graphite electrodes 2, 3 as well as bulk resistance of the separators 5, 5 in the stacked assembly. Increase of power-generating efficiency needs separator material good of electric conductivity with small contact resistance with a graphite electrode. In this sense, a graphite separator has been used so far in the same way as in a phosphate-type fuel cell.

A graphite separator is manufactured by cutting a graphite block to a predetermined shape and machining the shaped block for formation of various openings and grooves. Due to the manufacturing process, a large sum of expenses is inevitably required for material and processing. As a result, a fuel cell becomes very expensive in total, and productivity is also inferior. Moreover, a separator made of brittle graphite is easily damaged by vibrations or shocks. These disadvantages are eliminated by use of a metal separator instead of a graphite separator. The metal separator is manufactured by punching or pressing a metal sheet, as disclosed in JP 8-180883 A.

However, metal materials, which are endurable in an atmosphere of a fuel cell with good properties, have not been offered to practical use so far. For instance, an atmosphere at the oxidizing electrode 2 is very offensive at pH 2-3 to a metal separator.

Stainless steel is a representative material resistant to a strong acid. Its acid-resistance is derived from a tough passive film formed on its surface, but the passive film causes increase of surface or contact resistance. As increase of contact resistance, a large amount of Joule heat is generated in the contact area. Consequently, an electric energy is consumed as a heat loss, and power-generating efficiency of a fuel cell is significantly reduced.

If reduction of surface or contact resistance caused by the passive is suppressed, a stainless steel separator good of corrosion-resistance can be built in the fuel cell, instead of a graphite separator. In this point of view, the applicant has proposed an improvement of electric conductivity by dotted distribution of carbon particles on a surface of a stainless steel, as disclosed in JP 11-121018A, JP 11-126621 and JP 11-126622A. Dotted distribution of carbon particles improves electric conductivity and reduces contact resistance of the stainless steel without necessity of expensive material. Such carbon particles do not put any harmful effects on corrosion-resistance of the stainless steel.

However, adhesion of carbon particles to a surface of a stainless steel is poor, although it becomes bigger by formation of a diffusion layer between carbon particles and a steel substrate. Carbon particles are often dropped from the surface of the steel substrate due to poor adhesion force, so that the surface of the steel substrate is not kept in a predetermined state with small contact resistance. A special technique is additionally required for bonding carbon particles to the surface of the steel substrate with good adhesion, resulting in man-hour increase.

SUMMARY OF THE INVENTION

The present invention aims at provision of a new metal separator for a low-temperature fuel cell which enables output of a big electric power without decrease of power-generating efficiency even in the state that many cell units are stacked together. The present invention is based on the newly discovered effects of electrolytic roughening on reduction of contact resistance.

The present invention proposes a stainless steel separator for a low-temperature fuel cell. The separator has a rugged surface, wherein a lot of fine pits are formed and fine projections stand close together around the fine pits. A surface of a stainless steel sheet is reformed to such the rugged state, by alternating electrolytic etching in a ferric chloride solution.

The inventors have continued various researches and experiments on relationship between surface conditions and contact resistance of a stainless steel sheet used as a separator of a low-temperature fuel cell, and discovered that a rugged surface is effective for reduction of contact resistance. An ordinary stainless steel sheet is coated with a passive film, in which Cr is enriched as compared with base steel. The passive film acts as a resistor and makes contact resistance higher. On the other hand, a rugged surface of a stainless steel sheet exhibits low contact resistance. Especially, roughening by alternating electrolytic etching in a ferric chloride solution remarkably reduces contact resistance of a stainless steel sheet.

Reduction of contact resistance by alternating electrolytic etching may be explained as follows:

When a stainless steel sheet coated with a passive film composed of oxides and hydroxides is subjected to alternating electrolytic etching, pits (d) are formed in the passive film at first during anodic electrolysis, and $H_2$ is generated during succeeding cathodic electrolysis, as shown in FIG. 2. Generation of $H_2$ temporarily raises a pH value in the pits (d) other than flat parts, to a level which promotes reaction of $Fe^{3+} + 3OH^- \rightarrow Fe(OH)_3$. A reaction product coats inner surfaces of the pits (d) and serves as a protective film (f) in the succeeding anodic electrolysis. The flat parts free from the protective film (f) are activated by nascent hydrogen and selectively dissolved, compared with the inner walls of the pits (d). As a result, pits (d) are newly formed at the flat parts.

Since the anodic and cathodic electrolyses are alternatively repeated during electrolytic etching, the stainless steel sheet is processed to such the surface state that a lot of fine pits (d) are uniformly formed over a whole surface and fine projections (p) stand close together around the pits (d), as shown in FIG. 3. The protective film (f) formed on the pits (d) and the projections (p) is a reaction product, which is different from an ordinary oxide film formed on a stainless steel sheet, after dissolution of a surface layer. The protective film (f) is uneven in thickness and includes numerous faults which extends to base steel.

When the stainless steel sheets are piled and pressed together with graphite electrodes 2, 3, fine projections (p) are intruded into the electrodes 2, 3 since the projections (p) are harder than graphite. Intrusion of the projections (p) ensures well-fitting of the stainless steel sheet to the electrodes 2, 3. Since the electrodes 2, 3 are also elastically deformed at parts in contact with the projections (p), the stainless steel sheet is firmly held in contact with the electrodes 2, 3 by elastic deformation stress in addition to a stacking pressure. Moreover, the stainless steel sheet is probably held in direct metal-graphite contact with the electrodes 2, 3 through faults in the protective film (f). Consequently, contact resistance between the stainless steel sheet and the electrodes 2, 3 is remarkably reduced.

There are many surface parts, which realize metal-graphite contact without the protective film (f) and serve as sites for passage of electrons, on the stainless steel sheet. Occurrence of direct metal-graphite contact means reduction of contact resistance between the graphite electrodes 2, 3 and stainless steel sheets regardless of oxide films formed thereon. Intrinsic corrosion resistance of stainless steel is maintained even in a state exposed to a corrosive atmosphere, since the other surface parts of the stainless steel sheets except the sites for passage of electrons are coated with the Cr-enriched protective films (f).

Alternating electrolytic etching is a process suitable for roughening a stainless steel sheet of 0.1-0.4 mm in thickness useful as a separator. Other roughening processes such as shot- or sand-blasting are inappropriate to a stainless steel sheet of such thickness. The alternating electrolytic etching is also advantageous in formation of a passive film (f) with high Cr concentration, compared with shot- or sand-blasting.

PREFERRED EMBODIMENT OF THE INVENTION

Figure 1A:
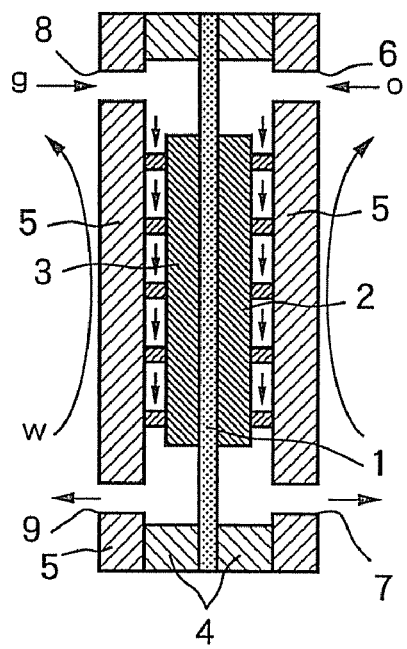
FIG. 1A is a sectional view illustrating an internal structure of a fuel cell using a macromolecular membrane as electrolyte.
Figure 1B:
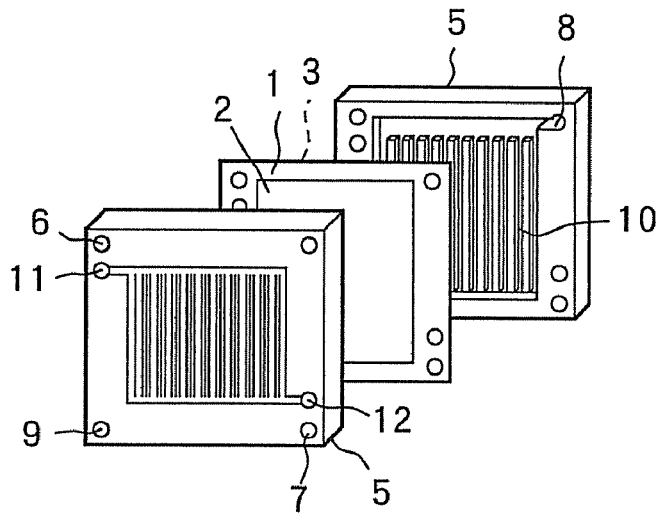
FIG. 1B is a perspective view of a disassembled fuel cell.
Figure 2:
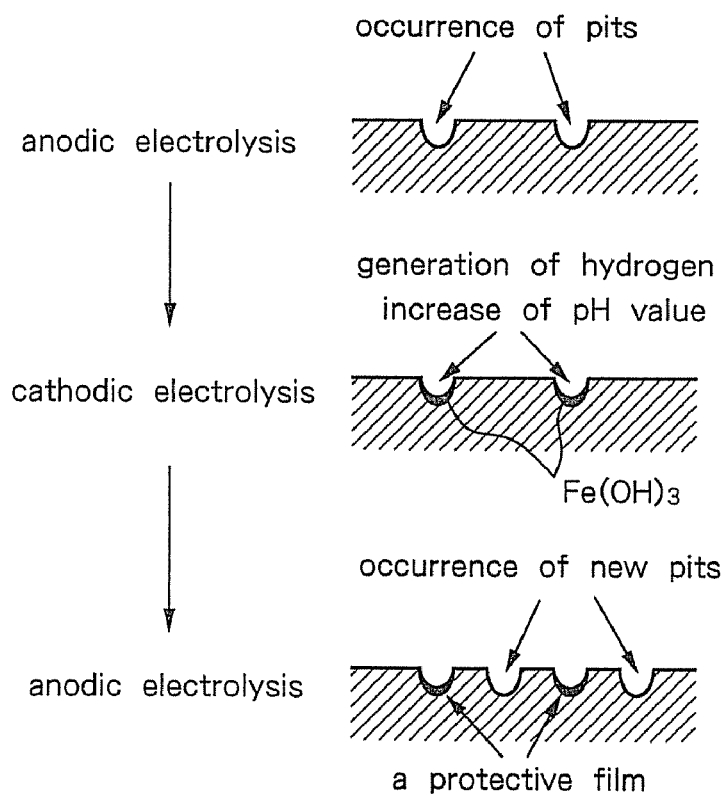
FIG. 2 is a schematic view for explaining formation of a rugged surface of a stainless steel sheet during alternating electrolytic etching.
Figure 3:
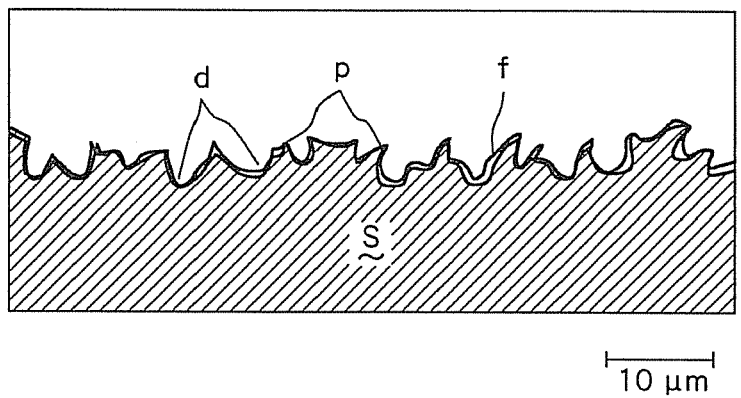
FIG. 3 is a schematic view illustrating a surface of a stainless steel sheet roughened by alternating electrolytic etching.

Any kind of stainless steels such as ferritic, austenitic or dual-phase stainless steel may be used as a separator material for a low-temperature fuel cell, as far as its corrosion-resistance is enough in an atmosphere of the fuel cell. A stainless steel sheet suitable for the purpose preferably contains 12 mass % or more of Cr for assurance of corrosion-resistance and has thickness within a range of 0.1-0.4 mm for fabrication of a fuel cell with ease.

The stainless steel sheet is roughened by alternating electrolytic etching in a ferric chloride solution, in order to effectively realize function of $Fe(OH)_3$ as a protective film for production of numerous pits (d). Inclusion of such anions as $NO_3^-$ and $SO_4^{2-}$ shall be controlled at a lower ratio in the ferric chloride solution; otherwise production of pits (d) would be impeded by oxidizing reaction of the stainless steel so as not to form a rugged surface suitable for the purpose.

Anodic current density is preferably controlled to 10.0 $kA/m^2$ or less during alternating electrolytic etching, in order to suppress decomposition of Cl ion in the ferric chloride solution. If the stainless steel sheet is etched with anodic current density above 10.0 $kA/m^2$, process efficiency and conditions are worsened due to violent decomposition of Cl ion. An anodic current-supply period is preferably determined within a range of 0.05-1 second, in order to process the steel surface to the state that a lot of fine projections (p) stand close together around the pits (d).

Cathodic electrolysis is performed with current density capable of hydrogen generation. The steel surface is activated by nascent hydrogen, and a protective film (f) is formed at an inner wall of each pit (d). However, too-big current density causes excessive generation of hydrogen and over-activation of the steel surface, pits (d) become shallow, and the surface state that the fine projections (p) stand close together around the pits (d) is diminished due to dissolution of the protective $Fe(OH)_3$ film (f) from the inner walls of the pits (d). In this sense, cathodic electrolysis is preferably performed with current density controlled within a range of 0.1-1 $kA/m^2$ for a current-supply period of 0.01 second or longer.

Proper current-supply periods per one cycle of alternating electrolytic etching is 0.05-1 second for anodic electrolysis and 0.01 second or longer for cathodic electrolysis. Accounting an alternating power source available for industrial use, a time ratio of anodic to cathodic electrolysis is preferably preset to 1:1, while cycles of alternating electrolysis are adjusted to 0.5-10 Hz.

The steel surface is processed to a properly rugged state by continuation of alternating electrolytic etching over 20 seconds or longer. If electrolytic etching is finished in a period shorter than 20 seconds, some parts of the steel surface remain as such without production of pits (d). Such the surface parts are ineffective for reduction of contact resistance and inappropriate for application of the etched stainless steel sheet to a separator of a low-temperature fuel cell. However, alternating electrolytic etching over a longer period than 120 seconds neither improves the rugged surface state nor reduces contact resistance any more in correspondence with prolong of the electrolysis.

The other features of the present invention will be more clearly understood from the following examples.

Example 1

Several stainless steel sheet having compositions shown in Table 1 were used as separator material. Each stainless steel sheet was roughened by electrolytic etching.

The stainless steel sheet A was roughened by alternating electrolytic etching in a ferric chloride solution containing 20 g/l of $Fe^{3+}$ at 50° C. for 60 seconds. Electrolytic etching was performed with anodic current density of 3.0 $kA/m^2$, cathodic current density of 0.2 $kA/m^2$ and alternating electrolysis cycles of 5 Hz.

The stainless steel sheet B was roughened by alternating electrolytic etching in a ferric chloride solution containing 55 g/l of $Fe^{3+}$ at 57.5° C. for 60 seconds. Electrolytic etching was performed with anodic current density of 3.0 $kA/m^2$, cathodic current density of 1.0 $kA/m^2$ and alternating electrolysis cycles of 5 Hz.

The stainless steel sheet C was roughened by alternating electrolytic etching in a ferric chloride solution containing 30 g/l of $Fe^{3+}$ at 50° C. for 40 seconds. Electrolytic etching was performed with anodic current density of 3.5 $kA/m^2$, cathodic current density of 0.8 $kA/m^2$ and alternating electrolysis cycles of 10 Hz.

The stainless steel sheet D was roughened by alternating electrolytic etching in a ferric chloride solution containing 70 g/l of $Fe^{3+}$ at 62.5° C. for 60 seconds. Electrolytic etching was performed with anodic current density of 3.0 $kA/m^2$, cathodic current density of 1.0 $kA/m^2$ and alternating electrolysis cycles of 5 Hz.

TABLE 1

| Steel Kind | Chemical Compositions Of Stainless Steel Sheets Alloying Components (mass %) | | | | | |
|---|---|---|---|---|---|---|
| | C | Si | Mn | Ni | Cr | Mo |
| A | 0.11 | 0.64 | 0.69 | — | 17.2 | — |
| B | 0.052 | 0.52 | 0.82 | 8.39 | 18.9 | — |
| C | 0.01 | 0.28 | 0.19 | — | 22.8 | 1.1 |
| D | 0.048 | 0.31 | 0.75 | — | 30.1 | 2.0 |

It was noted by microscopic observation of an etched surface of each stainless steel that fine pits (d) of 2 μm in average size and 1 μm in average depth were uniformly produced over a whole of the etched surface. Fine projections (p) of 2 μm or so in height were detected around the pits (d).

Each roughened stainless steel sheet was held in contact with a graphite electrode at a pressure of 0.98 MPa, to measure contact resistance between the stainless steel sheet and the graphite electrode. For comparison, each of stainless steel sheets A-D, which was 2D-finished but not subjected to electrolytic etching, was also examined under the same conditions. Results are shown as initial contact resistance values in Table 2. It is understood from the results that contact resistance of each stainless steel sheet was remarkably reduced by electrolytic etching.

Each of the roughened stainless steel sheets was further immersed in both a dilute sulfuric acid solution of pH 2 at 90° C. and hot water of 90° C., to investigate increase of contact resistance in response to an immersion period. Increase of contact resistance in either the dilute sulfuric acid solution or the hot water was also very little, in the case where the roughened stainless steel sheet was used as a separator. The 2D-finished stainless steel sheet was not subjected to the immersion test, since its initial value of contact resistance was too high for a separator of a fuel cell.

TABLE 2

| | | | Contact Resistance Between Steel Separator And Carbon Electrode | | |
|---|---|---|---|---|---|
| | | | Contact Resistance ($m\Omega \cdot cm^2$) | | Corrosion Weight |
| Steel Kind | Test Liquid | Condition of Separator Steel | Initial Value | After 168 Hrs. | Loss ($g/m^2 \cdot h$) |
| A | Dilute sulfuric acid solution | 2D-finished | 181 | — | — |
| | | Roughened | 16 | 16 | 0.00037 |
| | | 2D-finished | 181 | — | — |
| | Hot water | Roughened | 16 | 18 | — |
| B | Dilute sulfuric acid solution | 2D-finished | 178 | — | — |
| | | Roughened | 14 | 14 | 0.00033 |
| | | 2D-finished | 178 | — | — |
| | Hot water | Roughened | 14 | 17 | — |

TABLE 2-continued

Contact Resistance Between Steel Separator And Carbon Electrode

| Steel Kind | Test Liquid | Condition of Separator Steel | Contact Resistance (mΩ·cm$^2$) Initial Value | After 168 Hrs. | Corrosion Weight Loss (g/m$^2$·h) |
|---|---|---|---|---|---|
| C | Dilute sulfuric acid solution | 2D-finished | 136 | — | — |
|  |  | Roughened | 7 | 8 | 0.00026 |
|  | Hot water | 2D-finished | 136 | — | — |
|  |  | Roughened | 7 | 8 | — |
| D | Dilute sulfuric acid solution | 2D-finished | 198 | — | — |
|  |  | Roughened | 10 | 10 | 0.00011 |
|  | Hot water | 2D-finished | 198 | — | — |
|  |  | Roughened | 10 | 10 | — |

A surface of each stainless steel sheet was observed after the alternating electrolytic etching, and composition of a passive film (f) formed on the surface was measured by ESCA (Electron spectroscopy for chemical analysis). Results are shown in Table 3, in comparison with stainless steel sheets non-treated or subjected to shot-blasting. Data in Table 3 prove that the passive film (f) with high Cr concentration was formed on the surface of any stainless steel sheet roughened by the alternating electrolytic etching. The Cr-enriched passive film (f) bestows a stainless steel separator with excellent corrosion resistance.

TABLE 3

Effects of Electrolytic Etching on Composition of Passive Film

| Steel Kind | Test Liquid | Composition (mass %) of Passive Film | |
|---|---|---|---|
|  |  | Fe Concentration | Cr concentration |
| A | Non-treated | 56 | 44 |
|  | Shot-blasted | 75 | 25 |
|  | Electrolyzed | 22 | 78 |
| B | Non-treated | 55 | 45 |
|  | Shot-blasted | 53 | 47 |
|  | Electrolyzed | 25 | 75 |

Example 2

Figure 4:
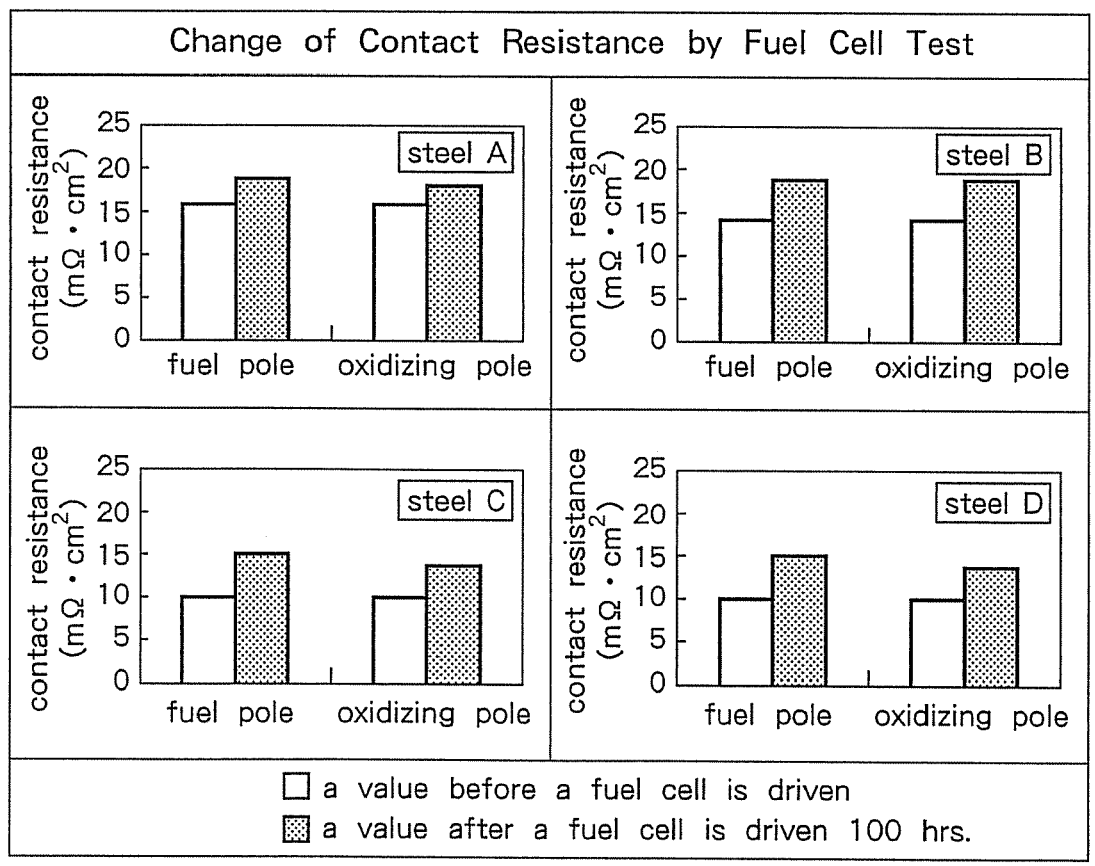
FIG. 4 is a graph showing change of contact resistance of a stainless steel separator built in a fuel cell.

An electrode assembly, which had a macromolecular membrane 1 stacked together with an oxidizing electrode 2 and a fuel electrode 3, was sandwiched between separators 5, 5 made from a roughened stainless steel sheet, so as to build up a fuel cell. The fuel cell was continuously driven 100 hrs. with constant current density of 0.5 A/m$^2$, while humid hydrogen and oxygen were supplied to the fuel cell. After the 100 hrs. driving, the separators 5 were detached from the electrode assembly for investigating occurrence of corrosion. No corrosion was detected in the separators made of any stainless steel sheet A-D, and increase of contact resistance was very little as shown in FIG. 4.

A separator for a low-temperature fuel cell according to the present invention as above-mentioned, is made of a stainless steel sheet having the surface state that a lot of fine projections stand close together around numerous pits. When the stainless steel separator is stacked and pressed together with graphite electrodes such as oxidizing and fuel electrodes, the fine projections on the steel surface are intruded into the graphite electrodes. Intrusion of the fine projections remarkably reduces contact resistance between the stainless steel separator and the graphite electrodes, while intrinsic acid- and corrosion-resistance of stainless steel is also maintained in the separator. Consequently, the stainless steel separator enables fabrication of a low-temperature fuel cell which is driven with high power-generating efficiency for a long time.

We claim:

1. A low-temperature fuel cell comprising: at least two electrodes, a solid membrane, and at least one separator plate wherein the at least one separator plate is a stainless steel sheet having a surface produced by alternating electrolytic etching, said surface comprising a plurality of fine pits formed over a whole surface and including fine projections standing close together around said pits and a protective film of Fe(OH)$_3$ formed on the plurality of fine pits and fine projections.

2. A low-temperature fuel cell comprising: at least two electrodes, a solid membrane, and at least one separator plate wherein the at least one separator plate is formed by providing a stainless steel sheet having a surface and roughening said surface by alternating electrolytic etching in a ferric chloride solution to provide said surface of said stainless steel sheet with a plurality of fine projections closely located around a plurality of pits and having a protective film of Fe(OH)$_3$ formed on the plurality of pits and fine projections.

* * * * *